April 15, 1930.  G. FRINGS  1,754,885
BUTTER CUTTER
Filed Aug. 15, 1929
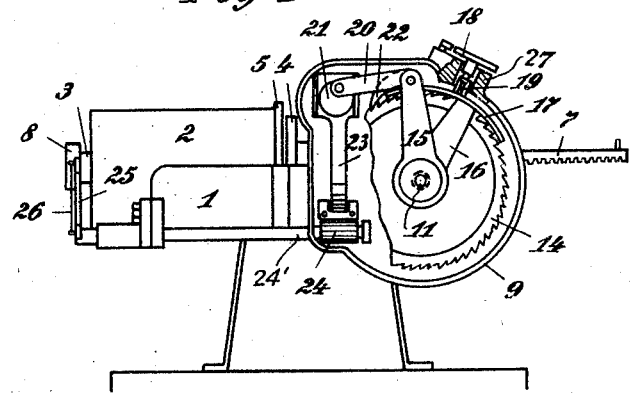
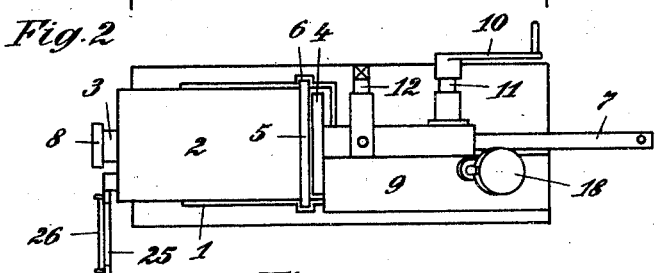
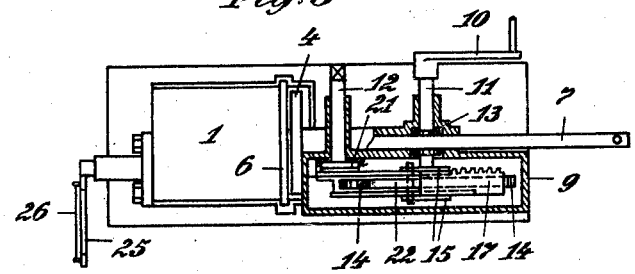
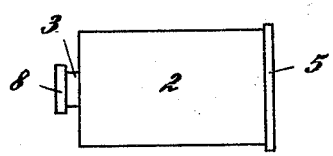
Inventor.
G. Frings,
by [signature] Atty.

Patented Apr. 15, 1930

1,754,885

UNITED STATES PATENT OFFICE

GERHARD FRINGS, OF COLOGNE-SULZ, GERMANY

BUTTER CUTTER

Application filed August 15, 1929, Serial No. 386,037, and in Germany September 2, 1927.

The invention relates to machines for cutting butter into small pieces for use in coffee bars, tea shops, hospitals and like places.

Machines for cutting butter into small portions are known which eject the butter from an interchangeable container or push it forward in the form of an intermittently advancing roll through a small or large orifice of any desired shape by means of a piston which is moved by ratchet wheel in dependence upon a rotating or oscillating cutter, whereupon the butter is cut off from the roll into pieces which are the equivalent of one, two or more portions. Although there are great advantages in dividing up butter mechanically in coffee and dining rooms and hospitals and similar places, the known machines for the purpose have not made headway because they are too complicated and, therefore, difficult and troublesome to handle and keep clean. Furthermore, the operation of setting the known machines to cut off pieces which are the equivalent of one, two or more portions is too complicated and takes too long, and with most machines it is altogether impossible to set them so that a pat or piece is obtained having a predetermined weight.

The invention has for its object the provision of a butter cutting machine of the kind hereinbefore described, in which, with a view to simplifying as far as possible both the mechanism of the machine and its handling and setting, the pawl of the device which moves the butter along, and the cutter are actuated together with unchanging stroke by means of a crank disc, which is rotated, for example, by a hand crank, whilst the step by step advance of the piston is controlled by causing the pawl to slide along a short or longer stretch of its unvarying stroke over an adjustable slide rail, which prevents the pawl from engaging in the member that produces the advancing movement—for example, a ratchet wheel—along this stretch. Only the slide rail along which the pawl slides a shorter or longer distance is adjusted, and this is effected by means of a graduated disc in order to obtain a pat or piece of the desired weight. The adjustment or conversion of the machine so that it will produce pats or pieces which are the equivalent of one, two or more portions is thus the work of a moment and no trouble or effort is involved.

The invention comprises the construction and arrangement of parts hereinafter described and shown in the accompanying drawings and claimed in the appended claim.

One embodiment of the machine according to the invention is shown in the accompanying drawings in which:

Figures 1 and 2 are, respectively, a front elevation and a plan of the machine with a butter container in position, and the piston in the withdrawn position.

Figure 3 is a sectional plan of the machine with the piston in the withdrawn position exposing the slotted bed ready to receive a butter container.

Figure 4 is a side elevation of a butter container suitable for use with the machine.

The machine illustrated has a semi-cylindrical bed 1, open at both ends, for the reception of a removable butter container 2, which has a beaded or flanged rim 5 for engagement with a slot 6 in the bed 1, when the container is simply placed on the bed. The container has an extrusion nozzle 3, the opening of which is of any desired shape according to the cross-section required for the extruded stick of butter. The nozzle has a cap 8 adapted to be firmly secured when the butter is to be subjected to preliminary compression.

The container may have one or more handles to facilitate quick insertion in and removal from the machine.

4 is the piston by which the preliminary compression of the butter in and the extrusion of the butter from the container is effected.

The piston rod 7 has rack teeth meshing with a pinion 13 on a shaft 11 which is carried in bearings on the machine frame 9.

When the shaft 11 is rotated by a hand crank 10, a continuous axial motion is imparted to the piston 4, for instance, in a forward direction, to compress the butter in a container set on the bed 1, and in a rearward direction to withdraw the piston from the container.

When an intermittent or step by step motion is to be imparted to the piston 4 to extrude the butter from a container through the nozzle 3 after removal of the cap 8, the crank 10, which is removable, is fitted to another shaft 12, carried in bearings in the frame 9. The shaft 12 has a disc crank 21 on one end which is connected by links 20 to two levers 15 which are freely mounted on the shaft 11. The levers 15 carry a pawl 22 which engages with the teeth of a ratchet wheel 14.

The ratchet wheel 14 is fixed on the shaft 11 so that as it is rotated intermittently the pinion 13 engaging with the rack teeth of the piston rod 7 imparts a step by step motion to the piston 4.

The disc crank 21 also acts as an eccentric to reciprocate a rod 23, which is provided at its lower end with rack teeth engaging with a pinion 24 on a shaft 24' carried in bearings alongside the bed 1. The shaft 24' has a wire bow cutter comprising an arm 25 and a wire 26. The cutter is thus caused to oscillate across the extrusion nozzle 3 in synchronism with the extrusion mechanism so as to cut the extruded stick of butter into pats. If a straight wire 26 be used the pats will be cut with a flat surface, but if a wavy wire be used the pats will be cut with an ornamental surface.

The cross-section of the stick of butter and, therefore, the corresponding shape of the pats will depend on the shape of the opening in the extrusion nozzle 3, which may be removable and interchangeable with others having different shaped openings.

In order that the thickness or weight of the pats may be varied, means are provided to enable the pawl 22 to be held out of engagement with the teeth of the ratchet wheel 14 for greater or shorter parts of its oscillation or forward stroke.

The means shown for this purpose comprise a shield 17 carried by two levers 16 which are freely mounted on the shaft 11. The inner edge of the shield 17 has teeth which mesh with a pinion 19 loosely mounted in bearings in a boss 27 on the frame 9.

The pinion 19 is attached to a dial 18 which can be rotated more or less by hand to set the shield 17 so that the pawl 22 can engage with the required number of teeth of the ratchet wheel 14 to ensure that the extrusion piston shall move sufficiently to extrude the butter through the nozzle 3 to the extent required for the desired thickness of pat to be cut off.

I claim:

A machine for cutting a butter mass into butter pats, comprising a frame, a butter container removably arranged in the frame and formed with an outlet to shape the butter pats, a piston fitted in said container to exert an endwise pressure on the material therein, a piston rod connected to the piston and extending beyond the container and formed on one edge with a series of teeth to provide a rack, a shaft mounted in the frame beyond the container, a pinion on said shaft cooperating with the rack on the piston rod, a ratchet wheel fixed on said shaft in spaced relation to the pinion, a second shaft mounted in said frame, a crank carried by said shaft, pawl mechanism operated by said crank to impart a step-by-step movement to the ratchet wheel to thereby operate the piston through the pinion and rack, manually adjustable means carried by the frame to selectively govern the cooperation of the pawl mechanism and ratchet for determining the movement of the ratchet in the operation of said second shaft, a cutter movable across the material outlet of the container to sever the material as it is projected through said outlet, and means operated by said crank to impart a rotary reciprocation to said cutter.

In testimony whereof I have signed my name to this specification.

GERHARD FRINGS.